March 23, 1965  R. E. PAIGE  3,174,894
DECORATIVE OBJECT

Filed July 3, 1961  5 Sheets-Sheet 1

INVENTOR.
RICHARD E. PAIGE

BY
*Armand E. Lackenbach*
ATTORNEY

March 23, 1965 R. E. PAIGE 3,174,894
DECORATIVE OBJECT

Filed July 3, 1961 5 Sheets-Sheet 2

INVENTOR.
RICHARD E. PAIGE
BY
*Armand E. Lackenbach*
ATTORNEY

March 23, 1965  R. E. PAIGE  3,174,894
DECORATIVE OBJECT

Filed July 3, 1961  5 Sheets-Sheet 3

INVENTOR.
RICHARD E. PAIGE
BY
ATTORNEY

March 23, 1965 R. E. PAIGE 3,174,894
DECORATIVE OBJECT
Filed July 3, 1961 5 Sheets-Sheet 4
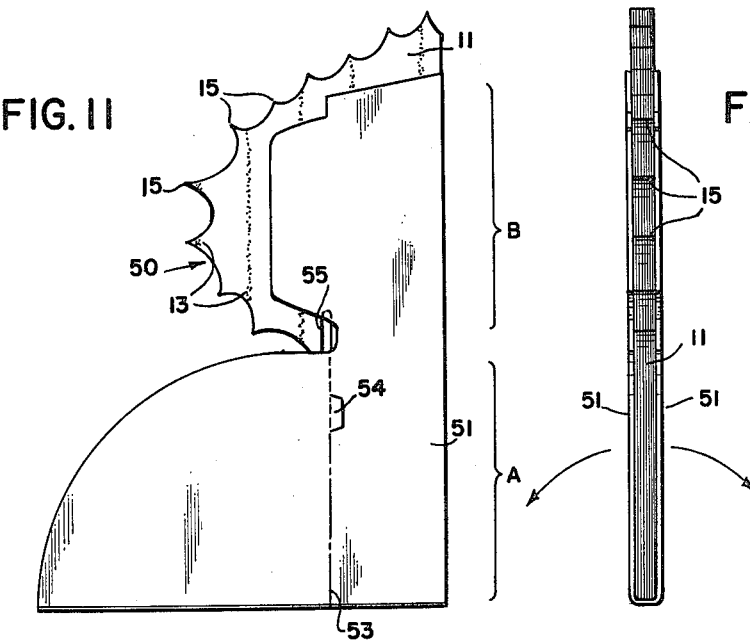
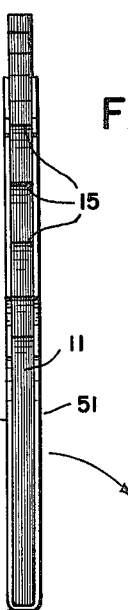
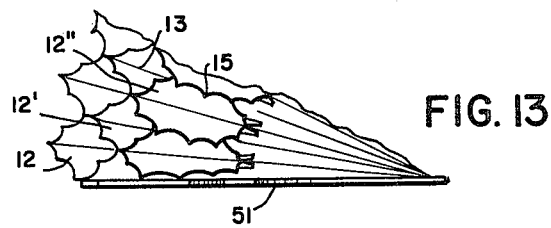
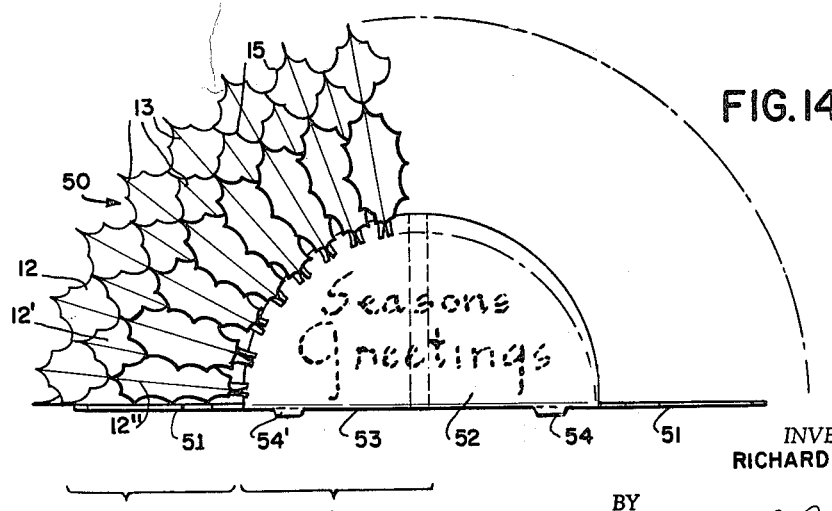
INVENTOR.
RICHARD E. PAIGE
BY
*Armand E. Lackenbach*
ATTORNEY March 23, 1965 R. E. PAIGE 3,174,894
DECORATIVE OBJECT
Filed July 3, 1961 5 Sheets-Sheet 5
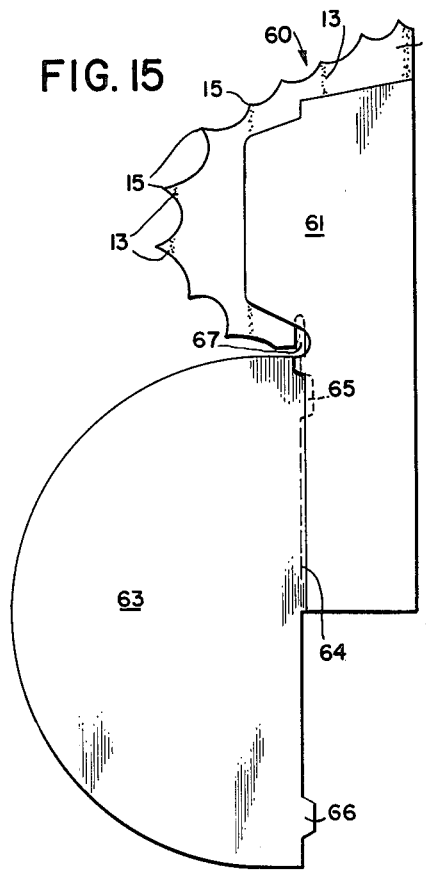
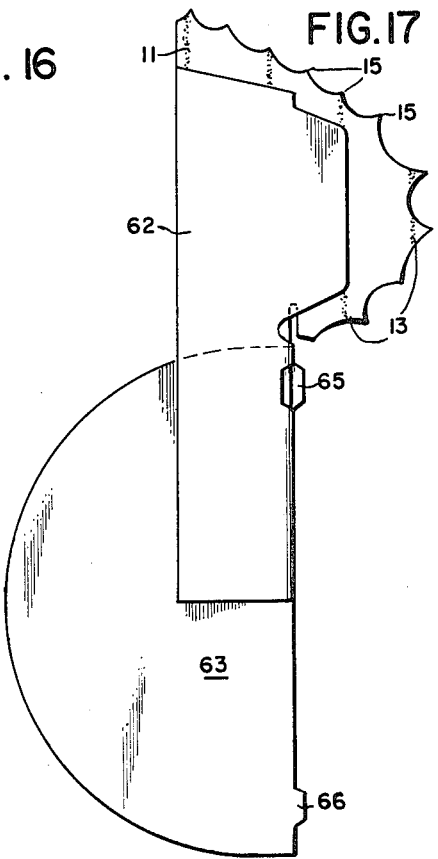
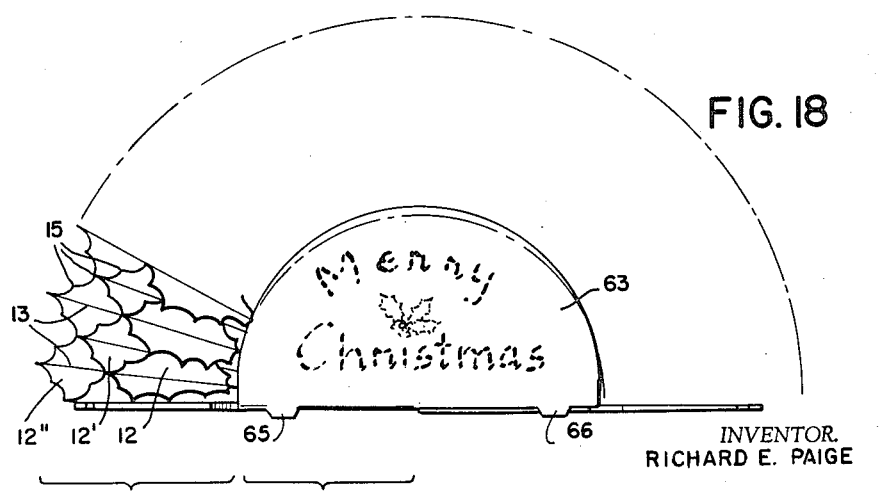
INVENTOR.
RICHARD E. PAIGE
BY
Howard E. Hackenback
ATTORNEY United States Patent Office 3,174,894
Patented Mar. 23, 1965

3,174,894
DECORATIVE OBJECT
Richard E. Paige, New York, N.Y., assignor to Paper Novelty Manufacturing Company, Stamford, Conn., a corporation of New York
Filed July 3, 1961, Ser. No. 123,351
7 Claims. (Cl. 161—14)

This invention relates to a decorative object and more particularly to the construction of a decorative object simulating a holly-leaf wreath.

The utilization of honeycomb paper material for making a variety of decorative objects, although an old art, has been greately limited, and the buying public has been reluctant to accept many such objects because of the lack of realism associated therewith. Consequently, only an extremely limited number of decorative honeycomb objects have enjoyed any degree of acceptance. For example, it is well, known that a Christmas wreath made of natural holly leaves is so constructed that each leaf is disposed so as to run parallel to a circular perimeter forming the wreath. Each leaf is further possessed of a degree of depth furnished by nature's particular process which, and when attempts at simulation have been made, the product made has lacked the three-dimensional effect necessary to attain the realism and natural beauty of a successful holly-leaf wreath.

It is, therefore, an object of the present invention to provide a decorative wreath made of honeycomb paper material which will simulate a wreath composed of natural holly leaves and which will possess the natural depths and dimensional effects of natural leaves.

A further object of the present invention is the provision of a wreath comprised of a plurality of simulated holley leaves possessing the structural formation of natural leaves.

A further object of the present invention is the provision of a unitary honeycomb paper structure which will simulate a wreath composed of a plurality of natural holly leaves.

A further object herein is the provision of a simulated holly-leaf wreath comprised of multiple layers of simulated leaves so as to more accurately simulate the quality of depth of a natural wreath.

As is well-known in the art, the leaves comprising the natural wreath are disposed circularly, running parallel to the circular perimeter of the wreath, so that the core or central portion of such wreath remains entirely open. In order to maintain the structural unity of the simulated wreath, the otherwise open core or central portion assumes the form of a radiating "spoke-like" structure. Although such structure may frequently lend symmetrical beauty to the simulated wreath, the overriding desire for a more natural holly wreath appearance may often be greater than the artificial symmetrical beauty in such structural arrangement.

It is, therefore, a further object of the present invention to provide means in a simulated holly-leaf wreath which will visually hide the central spoke-like radiating structure forming the wreath; and further to provide means for conveying a message to a viewer in such simulated wreath, utilizing the "core" or central portion thereof for such means.

Another object of the present invention is the provision of a simulated wreath having means for conveying a message to a viewer which is adapted to be collapsed so that it may be shipped and stored in flattened condition.

It is further known that the traditional wreath is utilized in a hanging position and entirely lacks means for its exhibition in a standing position upon a flat surface. The present invention has a further object, the provision of means which can be utilized to support the simulated wreath in a standing, upright position upon a flat surface, as a desk, mantle or the like, as well as to suspend such wreath in the conventional manner.

In general, achievement of the foregoing objects and advantages of the present invention is secured by the employment of a honeycomb structure constituted of a plurality of sheets of tissue paper, each sheet superposed upon another, the sheets being joined together along parallel adhesive lines, staggered on alternate sheets of paper, and progressively built up until an appropriate and desired thickness is attained. In die-cutting the resulting honeycomb blanket in the design of a half profile of a holly-leaf, provision is made for disposing the adhesive lines inwardly from the leaf edge and a second adhesive line disposed at the edges of the simulated leaf adapted to secure the edges of one leaf with its adjacent member. When the tissue sheets forming the simulated leaf are parted in a continuous pull-out form the resulting leaf will be comprised of a back of one sheet and the front of another, with the inwardly disposed adhesive line forming a central vein in simulation of a natural leaf. The adhesive lines securing the tips or edges of the leaf accordingly acts to spread its adjacent member, and entirely negates any possibility of the sheets comprising the honeycomb structure to collapse as a flat form and lose any simulation of the natural object.

Further provision is made for sinking or recessing the central or core portion which, as has heretofore been noted, does not conform to the natural object being simulated, and means are provided in such area for conveying a message to the viewer when desired. Additional means are provided for the utilization of the circular wreath so that it may be utilized as a half-wreath, which may be provided with a message to a viewer as desired. Provision is also made for utilizing the simulated wreath in an upright position as well as suspending it in conventional manner. Means for flattening the simulated wreath are also provided to facilitate ease in handling, shipping, storage and the like.

Other objects, advantages, and inventive characteristics of this new and unique device will become apparent to those versed in the art from the following description of the present invention as illustrated in the accompanying drawings, in which similar reference characters identify similar parts in the several views and in which:

FIG. 11 is a plan view of a further embodiment of the present invention shown in collapsed position;

FIG. 12 is an end view of the simulated wreath illustrated in FIG. 11;

FIG. 13 is a view of the simulated wreath as illustrated in FIG. 11 partially opened, and prior to the addition of the message bearing means thereto;

FIG. 14 is a view of the simulated wreath in opened position, showing the message bearing means;

FIG. 15 is a view of a further embodiment of the present invention in collapsed position;

FIG. 16 is an end view of the embodiment illustrated in FIG. 15;

FIG. 17 is a view of the embodiment illustrated in FIG. 15 in collapsed and folded position; and FIG. 18 is a view of the same embodiment in opened position.

Figure 1:
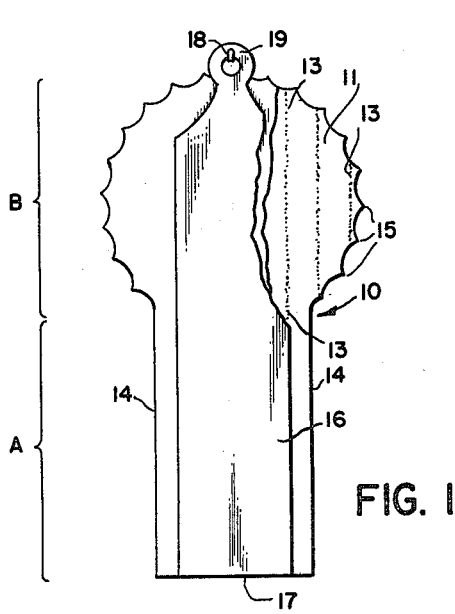
FIG. 1 is a plan view of the simulated wreath according to the present invention shown in collapsed position.

Referring now to the drawings, the simulated holly-leaf wreath 10, according to the present invention is comprised of a honeycomb blanket structure 11, made of a plurality of adjacently superposed layers of paper 12, 12', 12", joined together along parallel adhesive lines 13, staggered on alternate sheets of paper. The blanket 11 is then die-cut generally assuming the configuration, as shown in FIG. 1, and is comprised of a substantially elongated rectangular lower portion "A," the vertical edge 14, thereof being parallel to adhesive lines 13.

An upper portion "B," extending from portion "A" is die-cut to assume the contour of a half-profile of the object being simulated, which in the present instance is a holly-leaf. In die-cutting portion "B," the edge of blanket 11 assumes a substantially oval, wavy margined, spiny-toothed edge 15 in simulation of such half-profile of a holly-leaf. The adhesive lines 13, extending upwardly from portion "A" are especially disposed at the spiny-toothed edge 15, so that such edge 15 is alternately secured on alternating layers of paper 12, 12' as a result of adhesive lines 13, staggered as they are on such alternating paper layers 12, 12'. It will be evident that the half-profile of the leaf when expanded into an opened position is comprised of the back of one sheet and the front of the adjacent sheet, such sheets secured medially by adhesive lines 13, such adhesive lines 13 forming a simulated central vein of the leaf, and edges 15, being alternately secured to each other, imparts the dimension of depth so that an otherwise "flat" leaf is avoided.

The outermost layers of blanket structure 11 on either side thereof are secured to reinforcing strips 16, 16' substantially, although not necessarily, assuming the general configuration of the die-cut blanket structure 11. In the particular embodiment as illustrated in FIG. 1 where one such strip 16 is shown, reinforcing strip 16 extends vertically the length of blanket structure 11, and is somewhat narrower than said blanket structure 11, while the bottom edge 17 thereof is flush with the bottom edge of blanket structure 11. The bottom edge of blanket structure 11 is further bound by gluing or other means, so that in combination with edge 17 serving as a hinge or axis, the necessary leverage is provided to radially expand the wreath 10 to an open position.

Reinforcing strips 16, 16' are further provided with fastening means, such as a clip 18, adapted to retain the wreath in an opened position, and securing means such as aperture 19, 19' extending upwardly from reinforcing strips 16, 16' adapted to be lodged within a hook or the like, in order to suspend or otherwise mount the wreath 10, for display purposes.

Figure 2:
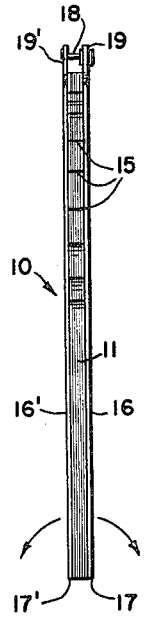
FIG. 2 is an end view of the simulated wreath as shown in FIG. 1.
Figure 3:
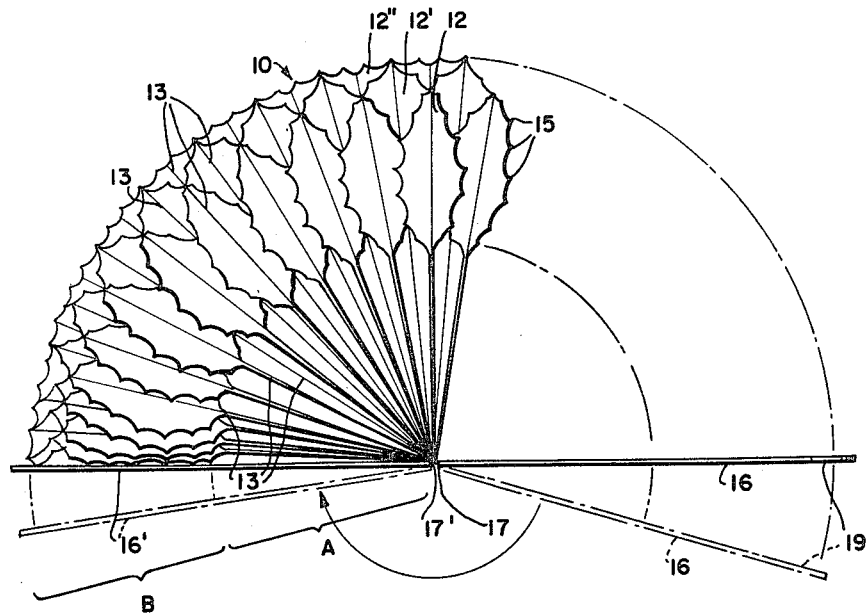
FIG. 3 is a view of the simulated wreath shown partially opened.
Figure 4:
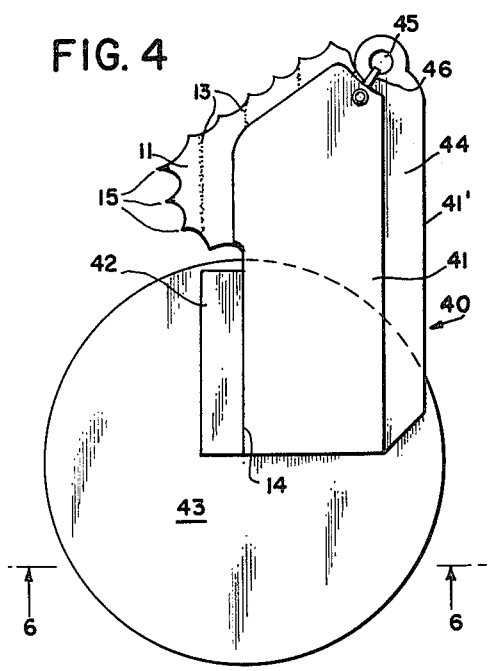
FIG. 4 is a plan view of a second embodiment of the present invention in collapsed position.
Figure 5:
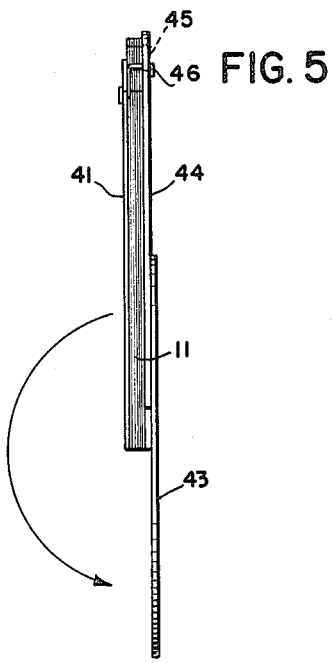
FIG. 5 is an end view of the simulated wreath illustrated in FIG. 4.
Figure 6:
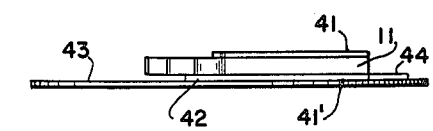
FIG. 6 is a view taken on line 6—6 of FIG. 4.
Figure 7:
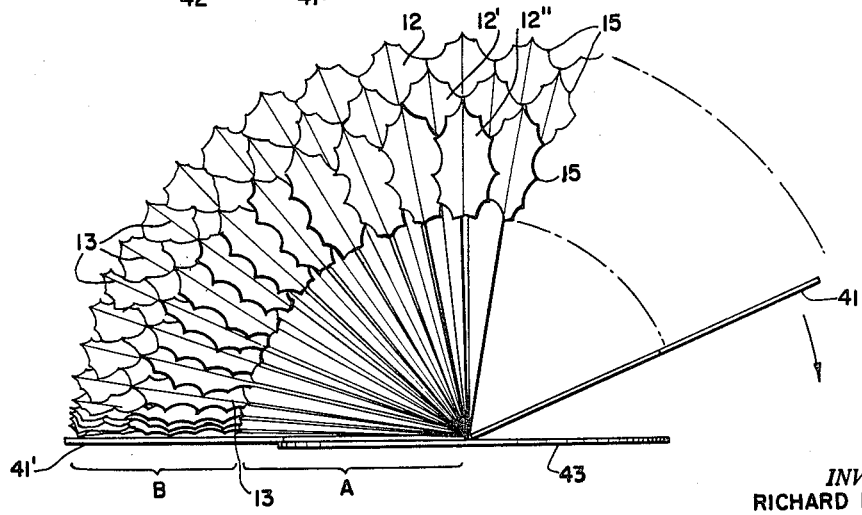
FIG. 7 is a view of a simulated wreath shown in FIG. 4 partially opened.
Figure 8:
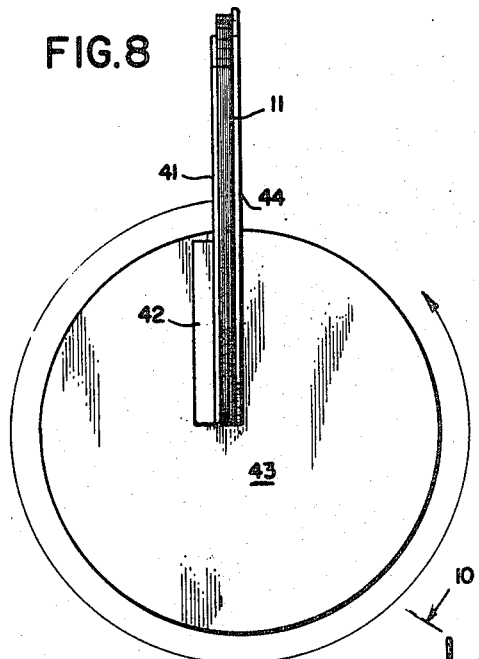
FIG. 8 is a view of the simulated wreath at right angles to the stand and/or message bearing portion thereof.
Figure 10:
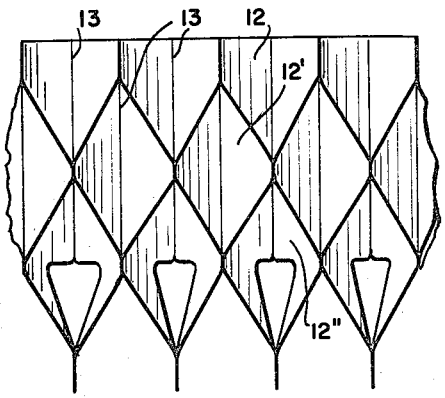
FIG. 10 is a view taken on line 10—10 of FIG. 9.

In utilizing the simulated holly-wreath 10, reinforcing strips 16, 16' are radially extended within a 360° arc as indicated in FIG. 2, the bottom edge 17, 17' of strips 16, 16' respectively acting as a hinge as heretofore noted whereby a circular wreath results. The simulated holly-leaves forming the wreath 10, as a result of the specific construction according to the present invention will be disposed parallel to the circular perimeter thereof. Where the wreath 10 is desired to be utilized as a "half" wreath, reinforcing strips 16, 16' may be disposed at an angle of 180°, such strips 16, 16' serving as the base thereof, so as to permit the wreath to be maintained in an upright position.

In the present embodiment, the holly-leaf profile is substantially circular to include substantially the entire area of portion "B." This permits the wreath 10, when in expanded and opened position to be viewed from two surfaces, as for example, when such wreath 10 is displayed in a window, it may be viewed from the outside, as well as from within the interior of the situs of display. Such profile may however be limited so as to be disposed within less than 180° range in portion "B," in which case one vertical edge of portion A will be upwardly extended through portion "B." The resulting wreath in such case will be possessed of one substantially "flat" surface adapted to lay flush upon a flat surface, as for example, a wall or the like.

In a second embodiment, the simulated wreath 40, as illustrated in FIGS. 4 to 10, is further provided with means for conveying a message to the viewer, and which may alternatively be utilized as a stand or support for maintaining the simulated wreath 40 in a standing or upright position when partially opened.

The blanket structure 11 as heretofore described, is die-cut so as to comprise an elongated rectangular portion "A," the vertical edge 14 thereof being parallel to adhesive lines 13. The upper portion "B" extending from portion "A" is die-cut along one vertical edge thereof in simulation of a half-profile of a holly-leaf assuming a wavy-margined spiny-toothed edge 15. The adhesive lines 13, extending upwardly from portion "A" are particularly disposed at the spiny-toothed edge 15 so as to result in an alternate securement of edges 15.

The outermost layers of blanket structure 11 on either side thereof are secured to reinforcing strips 41, 41' fabricated of cardboard or like material; substantially assuming and overlaying blanket structure 11. A hinge portion 42 integrally formed with and laterally extending from reinforcing strip 41' protrudes beyond edge 14 of blanket structure 11 and generally extends the length of portion "A" thereof. Hinge portion 42 is secured by gluing or other means to a substantially circular disc 43, such disc thus being hingedly affixed to reinforcing strip 41. Disc 43 is adapted to be lodged within the area of portion A of blanket structure A, the surface thereof being adapted to receive a message. Reinforcing strip 41 is further provided with a second hinge portion 44 integrally formed with and laterally extending therefrom so as to protrude beyond the vertical edge 14' opposite edge 14, and extending the entire length thereof. At the upper end of hinge portion 44, an aperture 45 is provided for receiving a clip 46 or other securing means affixed to reinforcing strip 41 at the top thereof.

In utilizing the simulated wreath as a half wreath, the blanket structure 11 is radially expanded in a 180° arc. Disc 43 in such case acts as a stand, and reinforcing strip 41 and 41' resting thereupon are on a 180° or single plane therewith.

Figure 9:
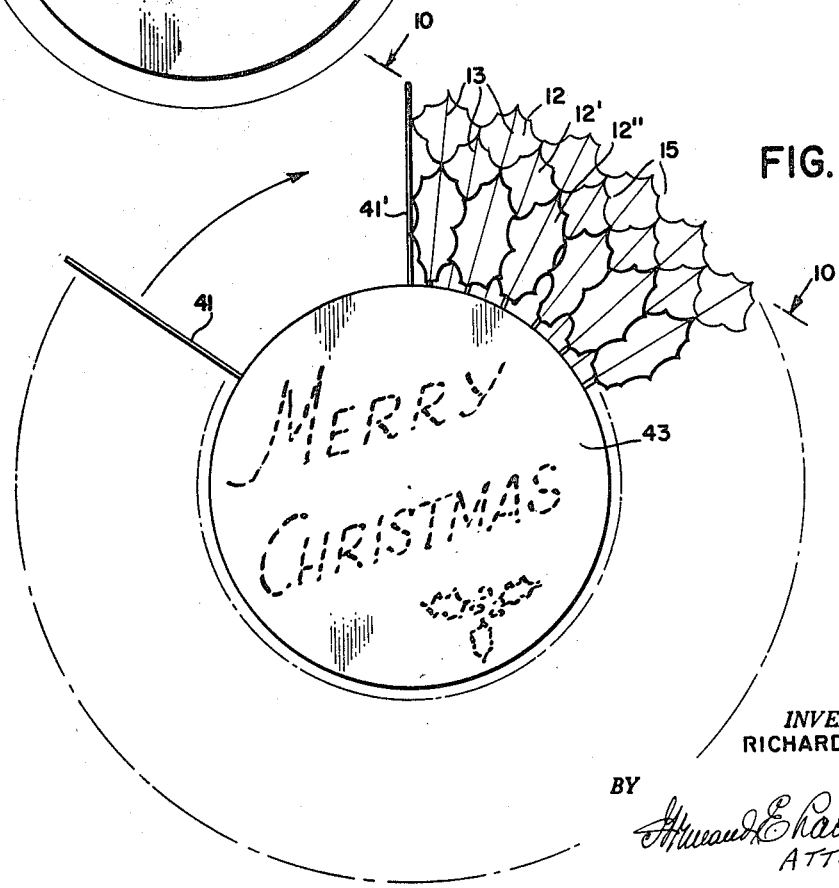
FIG. 9 is a view of the embodiment of the simulated wreath shown in FIG. 4, opened and showing the message bearing means.

When a full circular wreath is desired, blanket structure 11 with its reinforcing strips 41, 41' are turned so as to be perpendicular to disc 43. The blanket structure 11 is then raidally opened within a 360° arc around disc 43 as illustrated in FIG. 9.

The blanket structure 11 of the simulated wreath 40 as illustrated in FIGS. 11–14 is provided with reinforcing means comprising an elongated reinforcing strip portion 41 which is folded upon itself and adapted to envelop the blanket structure 11 to which it is secured to the outermost layers thereof. A half disc 52 extends from reinforcing strip portion 41 and is separated therefrom by a fold line 53. The radius of such half-disc 52 is slightly greater than portion "A." The center of the half disc is substantially at the point reinforcing strip portion 51 is folded upon itself. A pair of three-sided slits formed along the fold line 63 such slits protruding into reinforcing strip portion 51 provide the wreath 50 with legs 54, 54' when the wreath in expanded position as presently to be described is desired to be exhibited.

As reinforcing strip portion 51 is drawn apart, thus radially opening blanket structure 11 the half-disc 52 is folded inwardly along fold line 53 so as to overlay portion "A" of the blanket 11. An undercut portion 55 is provided in portion "B" at a point slightly above and contiguous to portion A, so that as half-disc 52 is folded thereupon, the arcuate edge is adapted to be fit within such undercut, and retained against any outward movement. Such half-disc too, it will be evident, effectively masks the spoke-like structure of portion "A," and a message or other design may effectively be placed thereupon.

It will also be seen that as half-disc 52 is folded upon expanded blanket structure 11, legs 54, 54' are disposed so as to give support at the front of the wreath 50 preventing such wreath from falling forward.

A further form which reinforcing means may assume is illustrated in FIGS. 15 to 18. The blanket structure 11 comprising the simulated holly leaf wreath 60 there shown comprises a reinforcing strip 61 secured to the outermost layer of blanket structure 11 at one side thereof. A second reinforcing strip 62 is secured to the outer layer on the opposite side of blanket structure 11 and a half disc 63, extending from the side of reinforcing strip 62, is separated therefrom by a fold line 64. The center thereof is at the lower outside point of said strip 62. The radius is slightly larger than the length of portion "A," thus forming a leg 65 along folded line 64, and part of the half disc.

Portion "A" is provided with an undercut 67 so that upon radial expansion of the honeycomb blanket 11 the half-disc 63 along the outer arcuate edge thereof may be lodged within said undercut for securement.

While specific embodiments have herein been described, it is apparent that changes and modifications may be made without departing from the scope of the present invention.

I claim:
1. In an expansible structure made from a plurality of alternately glued sheets of tissue, having spaced lines of adhesive running only the length of the structure, and joining adjacent sheets; the outermost lines of adhesive joining superposed half-sections to permit separation of said half-sections from complementary half-sections; pairs of half-sections forming repetitious series of planar representations of symmetrical objects.

2. In an expansible structure made from a plurality of alternately glued sheets of tissue, having spaced lines of adhesive running only the length of the structure, and joining adjacent sheets; the outermost lines of adhesive joining superposed half-sections to permit separation of said half-sections from complementary half-sections; pairs of half-sections forming repetitious series of planar representations of symmetrical objects, and display means; said pairs of symmetrical half-sections substantially bordering said display means; and means for retaining said display means to said expansible structure.

3. An expansible honeycomb tissue structure comprising a plurality of sheets joined by spaced lines of adhesive, offset in position with successive sheets, and a defining edge being cut to the profile form of a symmetrical object with that profile lying in the same direction as the lines of adhesive; said profile being longitudinally traversed by two lines of adhesive, one of said lines at the innermost, and the other of said lines at the outermost edges, to permit adjacent pairs of attached profile-sections to stretch each other out, thus presenting to view, comparatively flat, planar embodiments of the symmetrical object, repeated with each two sections throughout the structure.

4. A structure made from a blanket of honeycomb tissue joined by spaced lines of adhesive offset in position with successive sheets for forming a simulated holly-leaf wreath, the upper portion of said blanket having a free profile edge along at least one side thereof, simulating in outline half the profile of a holly-leaf, each having its center stem formed by said lines of adhesive, a lower substantially rectangular portion downwardly extending from said upper portion, the bottom edge of said lower portion bound to serve as an axial pivot point for the expansion of said blanket's profile edge, within a range of from 0° to 360° to form a repetitious series of planar representations of symmetrical objects when said structure is in expanded position.

5. A structure made from a blanket of honeycomb tissue joined by spaced lines of adhesive offset in position with successive sheets for forming a simulated holly-leaf wreath, the upper portion of said blanket having a free profile edge along at least one side thereof, simulating in outline half the profile of a holly-leaf, each having its center stem formed by said lines of adhesive, a substantially rectangular portion downwardly extending from said upper portion, the bottom edge thereof bound to serve as an axial pivot point for the expansion of said blanket's profile edge within a range of 0° to 180° to form a repetitious series of planar representations of symmetrical objects when said structure is in expanded position, reinforcing strips of substantially the same outlines as that of said blanket and being secured to the outermost leaves thereof; and means for supporting said simulated wreath upon a substantially flat surface when radially expanded within a 180° arc.

6. A structure made from a blanket of honeycomb tissue joined by spaced lines of adhesive offset in position with successive sheets for forming a simulated holly-leaf wreath, the upper portion of said blanket having a free profile edge along at least one side thereof simulating in outline half the profile of a holly-leaf, each having its center stem formed by said lines of adhesive, a substantially rectangular portion downwardly extending from said upper portion, the bottom edge thereof bound to serve as an axial pivot point for the expansion of said blanket's profile edge within a range of from 0° to 180° to form a repetitious series of planar representations of symmetrical objects when said structure is in expanded position, reinforcing strips of substantially the same outline as that of said blanket and being secured to the outermost leaves thereof; and display means adapted to contain a message to a viewer, said display means overlaying the downwardly extending rectangular portion when in expanded position, said simulated wreath, when in expanded position within an arc of 180° adapted to encompass said display means.

7. A structure made from a blanket of honeycomb tissue joined by spaced lines of adhesive offset in position with successive sheets for forming a simulated holly-leaf wreath, the upper portion of said blanket having a free profile edge along at least one side thereof simulating in outline half the profile of a holly-leaf, each having its center stem formed by said lines of adhesive, a substantially rectangular portion downwardly extending from said upper portion, the bottom edge thereof bound to serve as an axial pivot point for the expansion of said blanket's profile edge within a range of from 0° to 360° to form a repetitious series of planar representations of symmetrical objects when said structure is in expanded position, reinforcing strips of substantially the same outline as that of said blanket and being secured to the outermost leaves thereof; and display means adapted to contain a message to a viewer, said display means overlaying the downwardly extending rectangular portion when in expanded position, said simulated wreath, when in expanded position of 360° adapted to encompass said display means.

References Cited by the Examiner
UNITED STATES PATENTS

| | | | |
|---|---|---|---|
| 1,414,006 | 4/22 | Beistle | 41—11 |
| 1,621,703 | 3/27 | Adams | 161—14 |
| 2,344,723 | 3/44 | Pettorossi | 41—11 |
| 2,346,824 | 4/44 | Cohen | 41—11 |
| 2,704,904 | 3/55 | Maas | 41—11 |
| 3,007,834 | 11/61 | Moeller et al. | 154—45.9 |
| 3,046,684 | 7/62 | Tritt | 161—14 |

ALEXANDER WYMAN, *Primary Examiner.*
EARL M. BERGERT, *Examiner.*